Aug. 4, 1970  W. BALLE  3,522,626
DEVICE FOR FEEDING TYRES INTO A TYRE VULCANIZING PRESS
Filed Oct. 24, 1967  5 Sheets-Sheet 1

Inventor
Walter Balle
By
Watson, Cole, Grindle & Watson
Attys.

Aug. 4, 1970          W. BALLE          3,522,626

DEVICE FOR FEEDING TYRES INTO A TYRE VULCANIZING PRESS

Filed Oct. 24, 1967          5 Sheets-Sheet 4

Inventor
Walter Balle
By
Watson, Cole, Grindle & Watson
Attys.

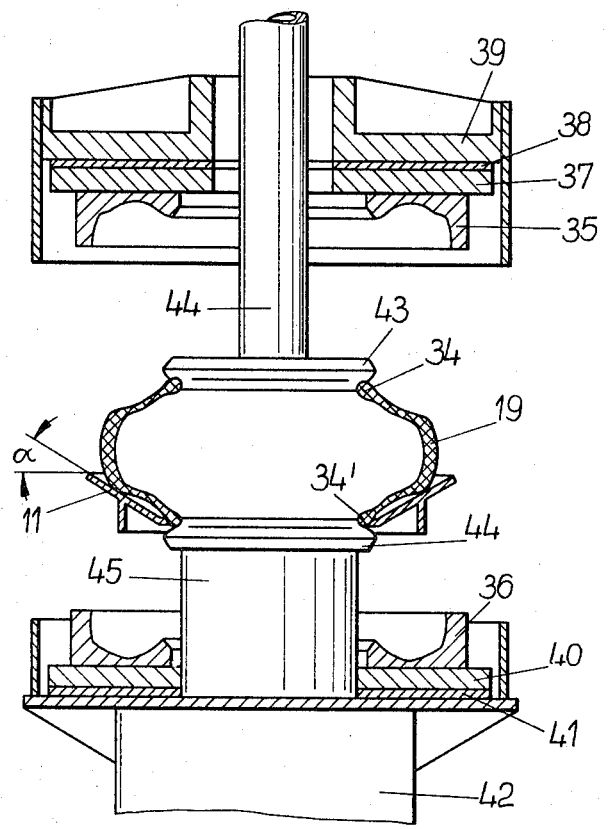

United States Patent Office 3,522,626
Patented Aug. 4, 1970

3,522,626
DEVICE FOR FEEDING TYRES INTO A TYRE VULCANIZING PRESS
Walter Balle, Dornigheim, Kreis, Hanau, Germany, assignor to Leonhard Maschinenfabrik Herbert, Bergen-Enkheim, Germany, a corporation of Germany
Filed Oct. 24, 1967, Ser. No. 677,568
Claims priority, application Germany, Oct. 27, 1966, H 60,878
Int. Cl. B29h 5/02
U.S. Cl. 18—2
15 Claims

ABSTRACT OF THE DISCLOSURE

While a tyre is being vulcanised in a press another tyre is located on a support external of the press and is centered on the support by an expandable centering device surrounded by the tyre and support. The support with centered tyre is lifted from the centering device and as the press mould opens is rotated with the support between the two halves of the mould where it is gripped by rim rings co-operating with the mould prior to the support being restored to the position thereof external of the mould.

BACKGROUND OF THE INVENTION

Field of the invention

The invention relates to a device for feeding tyres into a tyre vulcanising press.

Description of the prior art

For tyres which have not been precurved, feed systems are known in which the tyres are gripped from the outside by clamping segments, are lifted and rotated into the press, and lowered over the elongated heating bag of the press on to the lower rim or bead ring situated in the mould. After withdrawal of the feed mechanism, the heating bag is inflated by means of a pressurised fluid, the lower rim of the tyre being lifted in known manner off the lower bead ring, and the two tyre rims being centered by the uniformly expanding heating bag. The curvature is then formed by the upper portion of the press, that is the top half of the mould, being placed on the upper plate of the heating bag and pressed downwards. The tyre rims slip on to the slightly tapered rim seats on the rim or bead rings.

A feed device for preformed tyres is also known moreover (U.S. patent specification No. 2,997,738), in which the tyre blank has the upper tyre rim gripped by segments applying thrust from the inside towards the outside, being centered thereby, and then lowered on to the lower bead ring. The clamping and centering device is suspended from a crane. A system of this kind does not render it possible to grasp both tyre rims and to align these with each other, whilst upper and lower loose bead ring are brought into engagement with the tyre rims.

It is a main object of the present invention to provide a device by means of which the tyre is centered on the tyre rims at a position external of the press and is mechanically moved into the press to be gripped after centering by means of independently displaceable rim seats.

SUMMARY

According to the invention there is provided a device for inserting preformed tyres into a tyre vulcanising press, comprising an expandable centering device supportable externally of the press in a predetermined position relative thereto, a tyre support including a central bore mountable on the press for movement into and out of a position in which it surrounds the centering device and for pivotal movement from the position in which it no longer surrounds the centering device, the pivotal movement being effected in an arc which intersects the axis of the centering device and the axis of the mould halves of the press, said support including a radial cutaway portion to form a passage for elements arranged to center a tyre carried by the support between the halves of the mould, and actuating means operable to effect said movements of the support and expansion and contraction of the centering device while the device is surrounded by the support.

BRIEF DESCRIPTION OF THE DRAWINGS

FIG. 5 is a section, to an enlarged scale, of the two halves of the mould moved apart, of the centering device, and of a tyre in the condition in which the tyre is gripped by the tyre rim seats.

DESCRIPTION OF THE PREFERRED EMBODIMENT

Figure 1:
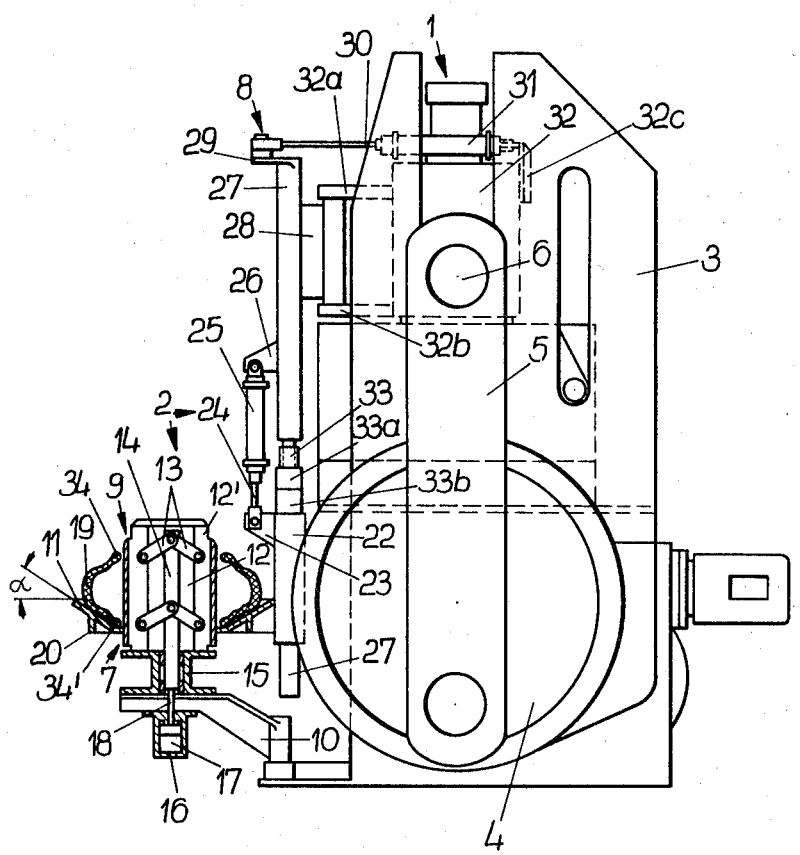
FIG. 1 is a side elevation, partly in section of a tyre vulcanising press equipped with a device according to the invention, the press being illustrated in the closed condition.
Figure 2:
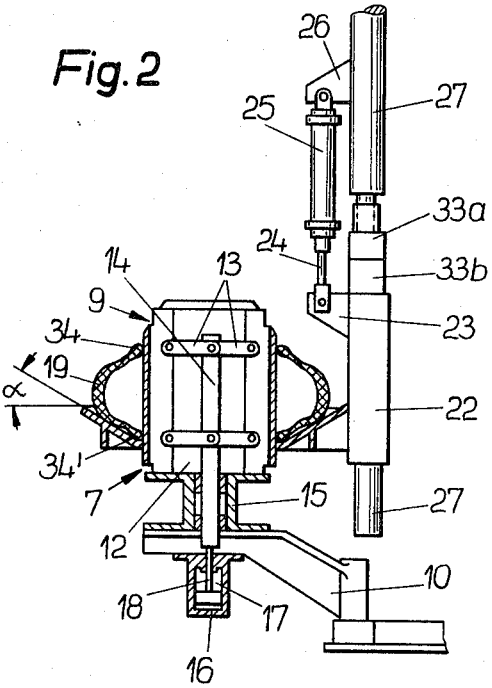
FIG. 2 is an elevation, partly in section of a feed device.

Referring to the drawings, a feed device, indicated generally by the reference 2, is fastened on the tyre vulcanising press, indicated generally by the reference 1, FIGS. 1 and 2. The press may be of any desired kind and is illustrated diagrammatically in the drawing, only the frame 3, a crank 4 and a connecting rod 5 being shown in detail. The upper end of the rod 5 carries the upper portion of the mould, not illustrated in FIG. 1.

The feed device 2 comprises a centering portion indicated generally at 7, and a lifting and swivelling mechanism indicated generally at 8. Control devices, not shown, are incorporated for automatic control of the movements of the feed device.

The centering portion 7 comprises a centering drum 9 which is fastened on a bracket 10 carried by the press frame 3, and a tyre support in the form of a centering bowl 11. The centering drum is built up of several segments of which two segments 12 and 12' are illustrated in FIGS. 1 and 2. The segments are pivotally mounted on a vertical rod 14 by links 13 and the rod 14 is guided for axial movement in a bearing 15 and is rigidly connected to the piston rod 18 of a piston 17 movable axially in a pneumatic or hydraulic cylinder 16.

The centering bowl 11 has a hollow frusto-conical internal shape and the angle alpha, FIGS. 1, 2 and 5, of the slope of the bowl is so chosen, that the bowl corresponds to the inclination of the sidewall of a tyre 19 which is to be centered. Because of the frusto-conical shape of the bowl 11 a wide support is provided for the tyre and this is an advantage in view of the unstable structure of the unvulcanised tyre. A reinforcing ring 20 is welded to the under side of the bowl in order to stiffen the bowl. It will be seen from FIG. 4 that the bowl has a radial cutaway portion 21 and the bowl is releasably connected to an axial slidable sleeve 22, FIGS. 1 to 3, so that it may be taken off for mould replacement and other setting operations on the press.

The sleeve 22 forms a part of the lifting device 8 and carries a lug 23 to which is pivotally connected the piston rod 24 of a pneumatic cylinder 25 which in its turn is pivotally connected to a lug 26 carried by a rod 27. The rod 27 is fastened by a coupling element 28 to a sleeve 28a which is rotatable on a spindle, not shown, which is supported between lugs 32a and 32b of the thrust bar 32 of the press. The axis of rotation of the sleeve 28a is so positioned that the centre of the bowl 11 is movable in an arc which intersects the axis of rod 14 of the centering device and the axis of the mould 35, 36.

The upper end of the rod 27 carries a lug 29 which extends radially outwards from the rod 27 and to which is pivotally connected the piston rod 30 of a pneumatic cylinder 31, which is secured to the thrust bar 32 by means of a bearing block 32c. On the rod 27, which is formed as a single uninterrupted unit, is provided a screw thread 33 on which are screwed a nut 33a and a locknut 33b. The nuts 33a, 33b form a displaceable abutment for the sleeve 22. By adjustment of the position of the abutment the lower rim of a tyre may be aligned in a vertical sense on a bead ring 44, FIG. 5.

Figure 3:
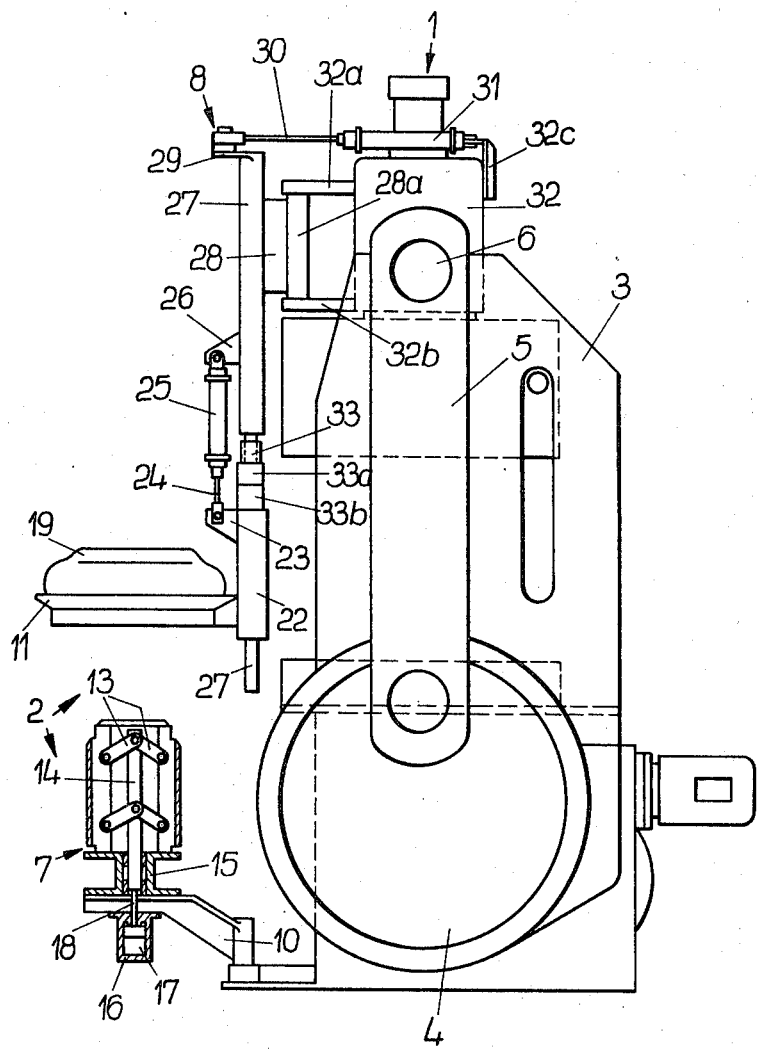
FIG. 3 is a view similar to that of FIG. 1 but with the press opened and a tyre raised.
Figure 4:
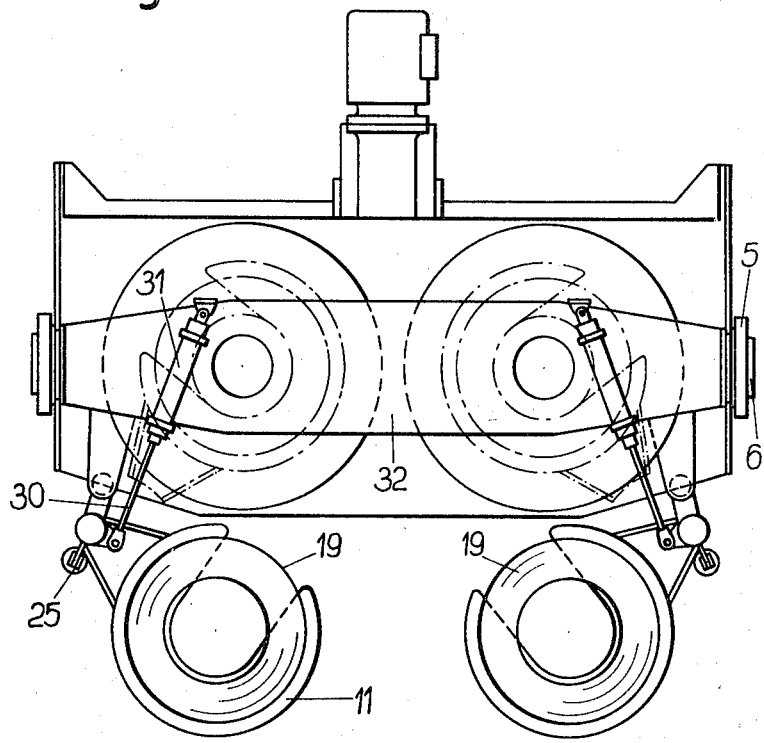
FIG. 4 is a top plan view of the vulcanising press, the position of centering devices situated outside the press being shown by full lines and the position thereof when located between the halves of the mould of the press being shown by broken lines.

The device operates as follows:

With the press closed (FIG. 1), that is to say during the vulcanising of a tyre, the next tyre to be treated is centered. To this end the tyre is placed on the bowl 11 which as already mentioned, is so shaped that the tyre lies thereon with a maximum area of contact, that is the slope alpha corresponds to the inclination of the sidewall of the preformed tyre. The centering drum 9 is in the retracted condition thereof and is actuated preferably by an automatic control system, by compressed air which is admitted into the cylinder 16 to cause the rod 14 to be moved downwards, as viewed in FIG. 1, so that the drum is expanded to the position shown in FIG. 2. After expansion of the drum 9, the bowl is lowered slightly, so that it is displaced from the tyre. After the tyre has been centered the bowl is again brought into contact with the tyre in order to prevent the tread area from sinking, during the waiting period prior to insertion of the tyre into the press, and assuming an eccentric position relative to the tyre rims. The waiting period may amount to a heating period, that is to say approximately 15 minutes. During the opening of the press the rod 27 is raised together with the upper part of the press and so raises the bowl 11 through the rod 27, cylinder 25, and sleeve 22. By actuation of the cylinder 31, the rod 27 is then rotated through approximately 90°, thereby positioning the bowl 11 and the tyre resting thereon, between the two halves of the mould. In FIG. 4, the inserted position is shown in broken lines, and the waiting position, corresponding to FIG. 3, is shown in full lines.

The position between the upper and lower halves 35, 36 of the mould is illustrated in FIG. 5. The upper half 35 of the mould is connected to the thrust bar 32, FIGS. 1, 3 and 4, and is provided with a heating plate 37 and a thermally insulating layer 38. The lower part 36 of the mould is connected to the lower part 42 of the press and is provided with a heating plate 40 and an insulating layer 41. Upper and lower rim seating rings 43 and 44 are axially displaceable relative to the upper part 39 of the press and to the lower part 42 of the press, this displacement being possible independently of the displacement of the moulds. The upper rim seat ring 43 is carried by a hollow rod 44a and the lower rim seat ring is secured to a cylinder 45. The heating bag, not shown, is situated within the cylinder 45 and is thereafter to be extruded from the cylinder into the tyre.

After the bowl 11 has been rotated by rod 30 into position between the halves of the mould, the rim seat rings 43 and 44 are displaced against the tyre 19 to grip the tyre by its rims 34 and 34'. After this action, the bowl 11 is lowered slightly and is rotated outwards, this outward movement being permitted by the radial cutout 21 provided in the bowl.

The tyre now having been centered, the rim seating rings 44 and 43 are retracted, the upper part of the mould simultanously travelling downwards and coming into contact with the lower part 36 of the mould so that the tyre is enclosed in the mould and the vulcanising operation is then initiated.

In the foregoing description the support is of hollow frusto-conical shape but if desired it may be flat in which case the tyre is centered around the border of the central opening through the support. This centering action may occur at the ventral lateral flank of the tyre below or close to the tread area, that is at the shoulder of the tyre. This embodiment of the invention requires a special support for each size of tyre because the central opening must correspond to the tyre size.

In all instances it is preferred that the tyre support 11 is provided with an anti-slip surface which may, for example, consist of an abrasive or emery cloth.

As shown in FIG. 4 the vulcanising press may comprise two vulcanising moulds and each of the moulds have associated therewith a tyre-inserting device as described herein.

I claim:

1. A device for inserting preformed tyres into a tyre vulcanising press, comprising an expandable centering device supportable externally of the press in a predetermined position relative thereto, a tyre support including a central bore mountable on the press for movement into and out of a position in which it surrounds the centering device and for pivotal movement from the position in which it no longer surrounds the centering device, the pivotal movement being effected in an arc which intersects the axis of the centering device and the axis of the mould halves of the press, said support including a radial cutaway portion to form a passage for elements arranged to center a tyre carried by the support between the halves of the mould, and actuating means operable to effect said movements of the support and expansion and contraction of the centering device while the device is surrounded by the support.

2. A device according to claim 1, wherein the tyre support is flat shape and the border of the central bore is arranged to center the tyre along the convex sidewall.

3. A device according to claim 1, wherein the tyre support is of hollow frusto-conical shape having an angle of slope corresponding to the angle of inclination of the sidewall of a tyre.

4. A device according to claim 1, wherein the tyre support has an anti-slip abrasive surface.

5. A device according to claim 1, wherein the centering device comprises a drum the sides of which are formed by segments pivotally connected to a vertical rod movable axially to effect expansion and contraction of the segments.

6. A device according to claim 5, wherein a hydraulic or pneumatic cylinder is connected to the rod to effect axial movements thereof.

7. A device according to claim 1, wherein the mounting for the tyre support comprises a sleeve slidable axially of a vertical guide rod under control of a cylinder.

8. A device according to claim 7, wherein the guide rod is connectable to a press member which is movable with an upper mould portion of the press.

9. A device according to claim 7, wherein the guide rod is rotatable about the axis thereof by a pressure cylinder connected to the rod to be eccentric to the axis thereof, said cylinder movable with an upper mould portion of the press.

10. A device according to claim 7, wherein the guide rod is rotatable about the axis thereof by a pressure cylinder connected to the rod to be eccentric to the axis thereof, said cylinder movable with an upper mould portion of the press.

11. A device according to claim 7, wherein the guide rod is connectable to a press member which is movable with an upper mould portion of the press.

12. A device according to claim 7, wherein the guide rod is rotatable about the axis thereof the cylinder connected to the rod to be eccentric to the axis thereof, said cylinder movable with an upper mould portion of the press.

13. A device according to claim 7, wherein the guide rod is rotatable about the axis thereof by a cylinder connected to the rod to be eccentric to the axis thereof, said cylinder movable with an upper mould portion of the press.

14. A device according to claim 1, wherein the mounting for the tyre support comprises a sleeve slidable axially of a vertical guide rod under control of a pressure cylinder.

15. A device according to claim 1, wherein the tyre support is flat shape and the border of the central bore is arranged to center the tyre along the shoulder of the tyre.

References Cited

UNITED STATES PATENTS

| | | | |
|---|---|---|---|
| 2,944,283 | 7/1960 | Lawson | 18—2 |
| 3,053,400 | 9/1962 | Erickson et al. | 18—2 |
| 3,065,499 | 11/1962 | Brundage et al. | 18—2 |
| 3,134,136 | 5/1964 | Soderquist | 18—2 |
| 3,167,810 | 2/1965 | Soderquist | 18—2 |
| 3,222,715 | 12/1965 | Harris | 18—2 |
| 3,229,329 | 1/1966 | Heston et al. | 18—2 |
| 3,267,515 | 8/1966 | Ulan | 18—2 |
| 3,298,066 | 1/1967 | Soderquist | 18—2 |
| 3,378,882 | 4/1968 | Turk et al. | 18—2 |
| 3,380,115 | 4/1968 | Soderquist | 18—2 |

FOREIGN PATENTS 1,233,581  2/1967  Germany.

J. HOWARD FLINT, JR., Primary Examiner